June 14, 1960   R. B. PEALER   2,940,093
DRIVE RELEASE FOR GEARED THREADER
Filed Jan. 20, 1958   2 Sheets-Sheet 2

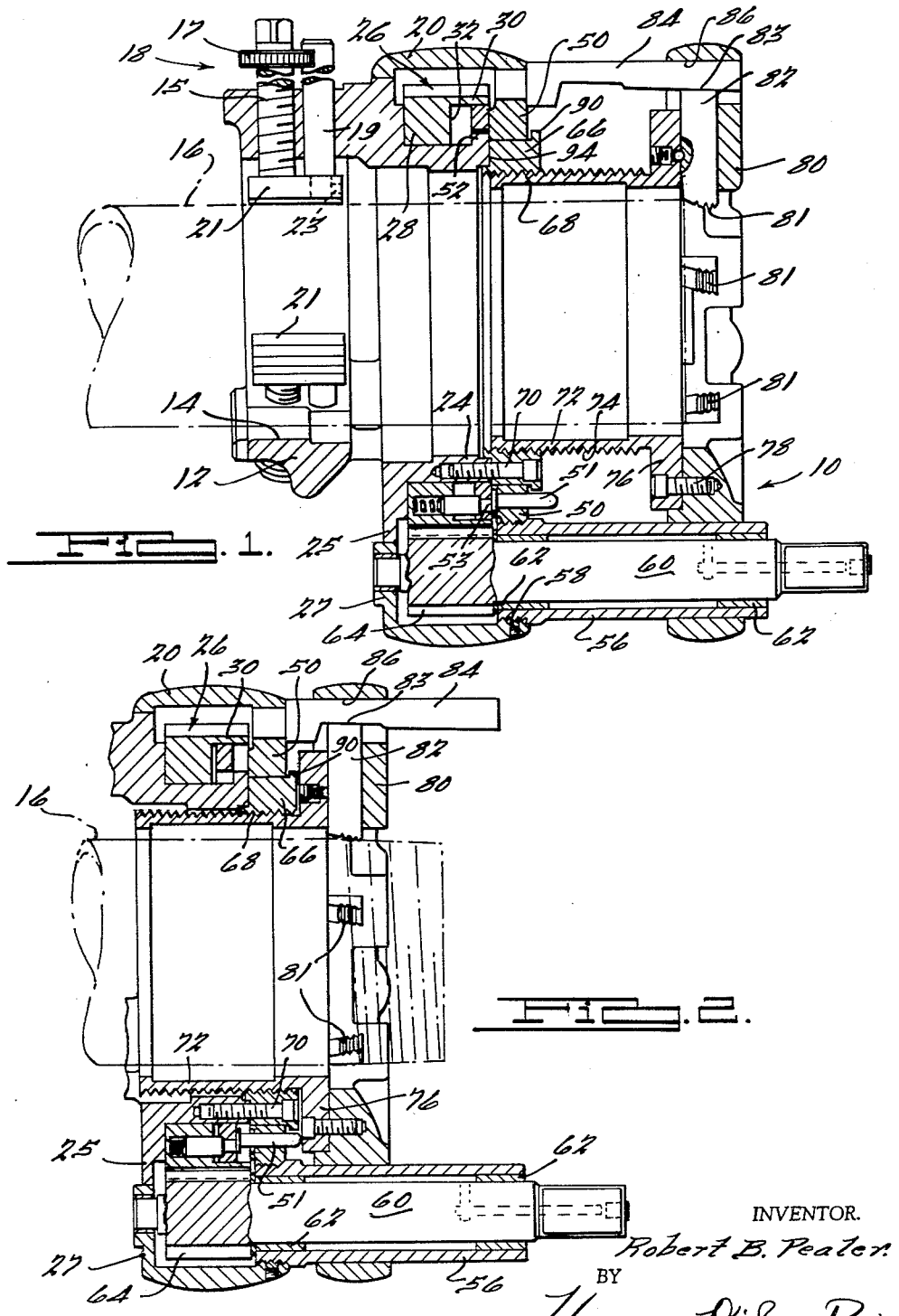

INVENTOR.
Robert B. Pealer
BY
ATTORNEYS.

United States Patent Office 2,940,093
Patented June 14, 1960

2,940,093

DRIVE RELEASE FOR GEARED THREADER

Robert B. Pealer, Toledo, Ohio, assignor to The Toledo Pipe Threading Machine Co., Toledo, Ohio, a corporation of Ohio Filed Jan. 20, 1958, Ser. No. 709,924

3 Claims. (Cl. 10—120.5)

This invention relates generally to pipe threaders and more particularly to a geared threader which includes an automatic drive release for discontinuing the threading operation after a predetermined length of a pipe has been threaded.

In pipe threaders, a jam-proof feature is desirable so that a pipe threading operation terminates automatically without manual attention and jamming of the threader parts is positively prevented.

The principal object of this invention, therefore, is to provide an improved pipe threader which operates automatically to terminate each pipe threading operation after a predetermined length of the pipe has been provided with a thread.

A further object of this invention is to provide a geared threader of the above type which utilizes a separate ring gear so that ring gears for several threaders can be cut in a stack.

Another object of this invention is to provide a geared threader of the above type which includes a separable lead screw and lead screw collar assembly so that different threads can be cut with the same threader by merely changing the lead screw and collar assembly.

Still a further object of this invention is to provide a geared threader of the above type which is simple in construction, economical to manufacture, and efficient in operation in forming threads on a workpiece and automatically terminating the pipe threading operation.

Further objects, features and advantages of this invention will become apparent from a consideration of the following description, the appended claims and the accompanying drawing in which:

Fig. 1 is a longitudinal sectional view of the threader of this invention, showing the relative positions of the threader parts at the beginning of a thread-cutting operation;

Fig. 2 is a longitudinal sectional view of the threader of this invention, illustrated similarly to Fig. 1, showing a moved position of the threader parts after the threader has operated to automatically terminate a threading operation.

Figure 3:
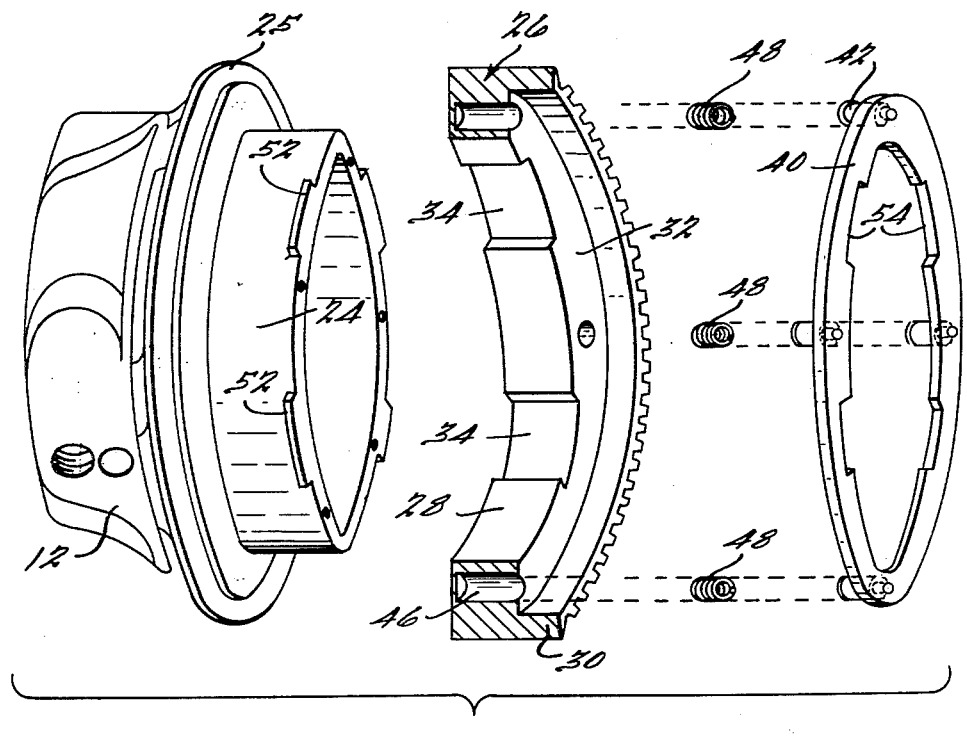
Fig. 3 is an exploded perspective view of a portion of the threader of this invention.

With reference to the drawing, the threader of this invention, indicated generally at 10, is illustrated in Fig. 1 as including a workholder 12 having a central opening 14 in which a pipe 16 to be threaded is positioned and clamped to the workholder by means of screw and jaw assemblies 18. Each assembly 18 includes a screw 15 provided with a knurled operating disk 17 which projects into a slot in the outer end of an indicator post 19 slidably supported in the workholder 14 alongside the screw 15. A clamping jaw 21, described in detail in application Serial No. 703,521, filed December 18, 1957, owned by the assignees of this application, is secured by a set screw 23 to the lower end of the indicator post 19 and is connected to the lower end of the screw 15 so that the screw is rotatable relative to the jaw 21 and the jaw 21 is movable toward and away from the pipe 16 with the screw 15.

The workholder 12 includes an integral tubular hub portion 24, which is coaxial with the workholder opening 14 and which supports a ring gear 26. An annular rim 25 at one end of the hub 24 supports an inwardly extending flange 27 on a gear case 20 which is positioned about the ring gear 26.

As shown in Fig. 3, the ring gear 26 has a first or bearing portion 28 rotatably supported on the hub 24 for the workholder 12, and a second recessed portion 30, and a radial shoulder 32 at the juncture of the portions 28 and 30. The bearing portion 28 is formed with evenly spaced notches or cutout portions 34 for a purpose to appear presently.

A clutch ring 40 positioned in the recessed gear portion 30 carries four pins 42 which are slidably supported within openings 46 in the ring gear bearing portion 28. Springs 48 in the openings 46 press against the pins 42 and normally maintain the clutch ring 40 in an outwardly moved position in which the ring is against an inwardly extending flange 50 on the gear case 20. In this position of the clutch ring 40, four spaced teeth 52 on the hub 24 are positioned within four corresponding notches 54 in the clutch ring 40. The teeth 52 and notches 54 are evenly spaced about the axis of the hub 24 and the clutch ring 40 so that the clutch ring can be arranged in any one of four positions in which any one of the teeth 52 is in any one of the notches 54. The notches 34 in the ring gear 26 are of a size such that during movement of the ring gear onto the hub 24, the teeth 52 are movable through the notches 34.

It can thus be seen that when the clutch ring 40 is in its spring-pressed position, it acts to lock the ring gear 26 to the workholder 12 since the pins 42 effectively connect the clutch ring 40 to the ring gear 26 and the teeth 52 and notches 54 provide for a releasable connection of the clutch ring 40 to the workholder 12.

A plurality of bumper pins 51 (only one of which is shown) are slidably supported in the flange 50 on the gear case 20 so that the pin heads 53 are in engagement with one face of the clutch ring 40. As will more clearly appear hereinafter, when the bumper pins 51 are moved in a direction toward the clutch ring 40, they act to move the clutch ring inwardly on the hub 24 so that the notches 54 are moved off the teeth 52 to release the ring gear 26 from the workholder 12.

An elongated tubular shaft housing 56 is threaded into an opening 58 in the gear case 20 so that the housing 56 is substantially parallel to and arranged to one side of a pipe 16 supported on the workholder 12 for threading. A drive shaft 60 rotatably supported on bearings 62 in housing 56 carries a pinion gear 64 positioned within the gear case 20 in mesh with the ring gear 26.

It can thus be seen that when the shaft 60 is driven, the pinion 64 rotates about the ring gear 26 when the ring gear is locked to the stationary workholder 12. During such movement, the gear case 20 also rotates about the ring gear 26. When the clutch ring 40 is moved inwardly to the position illustrated in Fig. 2 so that the ring gear 26 is unlocked from the workholder 12, driving of the pinion 64 merely effects a rotation of the gear 26 about the hub 24.

A lead screw collar 66 provided with internal threads 68 is secured by bolts 70 to the hub 24 so that the collar 66 is in a coaxial relation with the workholder opening 14. A lead screw or barrel 72 is provided with external threads 74 which mesh with the threads 68 on the collar 66. The lead screw 72 is provided at its outer end with an outwardly extending radial flange 76 which is secured by bolts 78, only one of which is shown, to the inside surface of an annular chaser frame 80 which carries chaser elements 82. The elements 82, which are spaced about the frame 80 in the usual manner, are provided at their inner ends with cutting teeth 81 and at their outer ends 83 are in abutting engagement with taper pins 84 secured to the gear case 20 and slidably supported in openings 86 in the chaser frame 80. On movement of the chaser frame 80 toward the gear case 20, in response to rotation of the drive shaft 60, the chasers 82 move outwardly by virtue of the tapered construction of the pins 84 so as to cut a tapered thread on the workpiece 16.

As shown in Figs. 1 and 2, the lead screw collar 66 is provided with an outwardly extending flange 90 which overlaps the gear case flange 50 and maintains the gear case on the workholder 12. The flange 50 is positioned between the flange 90 and the teeth 52 on the outer end 94 of the hub 24. The lead screw collar 66 is of a length such that the distance between the teeth 52 and the flange 90 is slightly greater than the width of the flange 50 so that the gear case is shiftable between positions in which the flange abuts either the teeth 52 or the flange 90. During cutting of a thread, the frictional forces exerted on the pins 84 and housing 56 by the chaser frame 80 moves the gear case 20 to the left as viewed in Fig. 1 so that the flange 50 abuts the teeth 52. When the lead screw 72 is to be backed off at the conclusion of a threading operation to position the chaser frame 80 for a subsequent threading operation, the gear case 20 is moved in the opposite direction to a position of the flange 50 against the flange 90 so that the chasers 82 are in effect retracted relative to the thread formed on the pipe 16 so that the chasers do not cut during return movement of the frame 80.

In the operation of the threader 10 to cut a thread on one end of the pipe 16, the drive shaft 60 is driven so that the pinion 64 is rotated about the ring gear 26 in a direction to advance the lead screw 72 on the collar 66. During rotation of the lead screw, the chaser frame 80 is similarly rotated to move the chasers 82 about the pipe 16 to cut a thread which is tapered in accordance with the taper of the pins 84. When the thread cutting operation has proceeded to the point where the flange 76 on the lead screw 72 moves the bumper pins 51 toward the clutch ring 40 sufficiently to move the clutch ring 40 in an axial direction a distance necessary to disengage the notches 54 from the teeth 52, as shown in Fig. 2, the threading operation is automatically terminated since the ring gear 26 will then merely rotate about the hub 24. The pins 51 are of a length such that advance of the lead screw 72 is terminated while the flange 76 is spaced from the collar 66. The operator can then discontinue the drive for the shaft 60 and manually rotate the chaser frame 80 and the lead screw 72 in an opposite direction to release the chasers 82 from the workpiece 16 which can then be removed from the workholder 12.

The springs 48 for the pins 42 provide for an automatic return of the clutch ring 40 to a position locking the ring gear 26 to the hub 24. In case the notches 54 are not aligned with the teeth 52, the shaft 60 is readily rotated a slight amount to rotate the ring gear 26 and the clutch ring 40 to align the notches 54 with the teeth 52 so that the threader 10 is in condition for the next threading operation.

From the above description, it is seen that this invention provides a threader 10 which is jam-proof by virtue of the releasable attachment of the ring gear 26 to the workholder 12. As a result of the inclusion in the threader 10 of a separate ring gear 26, as contrasted with forming ring gear 26 integral with hub 24, the ring gear teeth can be concurrently cut on a stack of ring gears. Such a construction makes it possible to produce a threader 10 at a reduced cost and, in addition, makes possible a separate replacement of a ring gear having worn teeth rather than requiring the replacement of an entire workholder 12 and integral ring gear 26. The attachment of the lead screw collar 66 to the workholder 12 by means of the bolts 70 makes it possible to readily detach the collar 66. Similarly, the lead screw 72 is readily detached from the chaser frame 80 by removing the bolts 78. Accordingly, to cut different threads on a workpiece 16, it is only necessary to remove the collar 66 and the lead screw 72 for replacement with corresponding parts having the requisite thread formation.

It will be understood that the specific construction of the improved geared threader which is herein disclosed and described is presented for purposes of explanation and illustration and is not intended to indicate limits of the invention, the scope of which is defined by the following claims.

What is claimed is:

1. In a pipe threader having a workholder, a ring gear rotatably mounted on the workholder, a pinion arranged in meshing engagement with the ring gear, a drive shaft for the pinion, and a chaser frame arranged in a coaxial relation with the workholder and connected to the drive shaft for rotatable movement in response to travel of the pinion about the ring gear; a lead screw attached to chaser frame and extending toward the workholder, means on the workholder threadably supporting the lead screw so that on rotation of the chaser frame in a thread cutting direction it is advanced toward the workholder, a clutch ring mounted on the ring gear so that the clutch ring is movable axially of the ring gear between two positions and is connected to the ring gear for rotation therewith, tooth and notch means on the workholder and the clutch ring arranged for interengagement in one of said clutch ring positions for locking the clutch ring to the workholder, and means engageable with the clutch ring for moving the clutch ring to the other of said positions for releasing the clutch ring from the workholder in response to a predetermined advance of said chaser frame.

2. In a pipe threader having a workholder, a ring gear rotatably mounted on the workholder, a pinion arranged in meshing engagement with the ring gear, a drive shaft for the pinion, a gear case for said gears, and a chaser frame arranged in a coaxial relation with the workholder and connected to the drive shaft for rotatable movement in response to travel of the pinion about the ring gear; a lead screw attached to the chaser frame and extending toward the workholder, means on the workholder threadably supporting the lead screw so that on rotation of the chaser frame in a thread cutting direction it is advanced toward the workholder, a clutch ring mounted on the ring gear so that the clutch ring is movable axially of the ring gear between two positions and is connected to the ring gear for rotation therewith, tooth and notch means on the workholder and the clutch ring arranged for interengagement in one of said clutch ring positions for locking the clutch ring to the workholder and bumper pins slidably mounted on said gear case and movable into engagement with the clutch ring for moving the clutch ring to the other of said positions for releasing the clutch ring from the workholder in response to a predetermined advance of said chaser frame.

3. In a pipe threader having a workholder, a ring gear rotatably mounted on the workholder, a pinion arranged in meshing engagement with the ring gear, a drive shaft for the pinion, and a chaser frame arranged in a coaxial relation with the workholder and connected to the drive shaft for rotatable movement in response to travel of the pinion about the ring gear; a lead screw attached to said chaser frame and extending toward the workholder, means on the workholder threadably supporting the lead screw so that on rotation of the chaser frame in a thread cutting direction it is advanced toward the workholder, a clutch ring mounted on the ring gear so that the clutch ring is movable axially of the ring gear between two positions and is connected to the ring gear for rotation therewith, tooth and notch means on the workholder and the clutch ring arranged for interengagement in one of said clutch ring positions for locking the clutch ring to the workholder, bumper pins slidably mounted on said gear case and movable into engagement with the clutch ring for moving the clutch ring to the other of said positions for releasing the clutch ring from the workholder in response to a predetermined advance of said chaser frame, and spring pressed means on the ring gear engaging the clutch ring for urging the clutch ring toward the first of said positions.

References Cited in the file of this patent

UNITED STATES PATENTS

| | | |
|---|---|---|
| 1,062,840 | Miller | May 27, 1913 |
| 2,504,018 | Gibson | Apr. 11, 1950 |
| 2,646,691 | Heisler | July 28, 1953 |
| 2,680,861 | Ingwer | June 15, 1954 |
| 2,753,575 | Ingwer | July 10, 1956 |